(12) United States Patent
Kumar et al.

(10) Patent No.: US 11,553,145 B2
(45) Date of Patent: Jan. 10, 2023

(54) METHODS AND SYSTEMS FOR INCREASING PSRR COMPENSATION RANGE IN AN IMAGE SENSOR

(71) Applicant: Samsung Electronics Co., Ltd., Suwon-si (KR)

(72) Inventors: Sandeep Santhosh Kumar, Bangalore (IN); Madhusudan Govindarajan, Bangalore (IN); Pushpita Dutta, Bangalore (IN)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 210 days.

(21) Appl. No.: 16/993,321

(22) Filed: Aug. 14, 2020

(65) Prior Publication Data

US 2021/0051280 A1 Feb. 18, 2021

(30) Foreign Application Priority Data

Aug. 16, 2019 (IN) .............................. 201941033110

(51) Int. Cl.
*H04N 5/357* (2011.01)
*H04N 5/3745* (2011.01)
*H04N 5/369* (2011.01)

(52) U.S. Cl.
CPC ........... *H04N 5/357* (2013.01); *H04N 5/3698* (2013.01); *H04N 5/37455* (2013.01)

(58) Field of Classification Search
CPC .. H04N 5/357; H04N 5/3698; H04N 5/37455; H04N 5/3577; H04N 5/378; H04N 5/3741
See application file for complete search history.

(56) References Cited

FOREIGN PATENT DOCUMENTS

WO WO-2017159394 A1 * 9/2017 ............. G05F 3/262

OTHER PUBLICATIONS

Translation of WO 2017159394 (Year: 2017).*

* cited by examiner

*Primary Examiner* — Shahbaz Nazrul
(74) *Attorney, Agent, or Firm* — Harness, Dickey & Pierce, P.L.C.

(57) ABSTRACT

A method for compensating a Power Supply Rejection Ratio (PSRR) in an image sensor, the method includes receiving, by processing circuitry, at least one analog signal from an active pixels sensor (APS) array, the at least one analog signal including power supply noise, combining, by the processing circuitry, amplified power supply noise with at least one ramp signal to obtain combined power supply noise, and compensating, by the processing circuitry, the PSRR of the APS array by cancelling the power supply noise of the at least one analog signal using the combined power supply noise.

20 Claims, 10 Drawing Sheets

Generate, by the line A connecting the PSRR compensation circuitry to the column read-out circuits, the phase delay on the correction path due to its parasitic elements — 802

Modify, by the PSRR compensation circuitry, the configurations of the Mp1 transistor of the current mirrors based on the generated phase delay on the correction path and the phase delay introduced on the pixel path — 804

Control, by the PSRR compensation circuitry, the impedance of the transistors based on the modified configurations to configure the phase delay on the correction path to match with the phase delay on the pixel path — 806

METHODS AND SYSTEMS FOR INCREASING PSRR COMPENSATION RANGE IN AN IMAGE SENSOR

CROSS REFERENCE TO RELATED APPLICATION

This application is based on and derives the benefit of Indian Provisional Application 201941033110 filed on Aug. 16, 2019, the contents of which are incorporated herein by reference.

TECHNICAL FIELD

The present disclosure relates to the field of image sensors and more particularly to compensating Power Supply Rejection Ratio (PSRR) in an image sensor with an increased PSRR compensation range.

BACKGROUND

In general, an image sensor (for example: complementary metal oxide semiconductor (CMOS) image sensors) convert optical signals/light energy into electrical signals. The image sensor includes an active pixel sensor (APS) array comprising a plurality of pixels and a read-out circuit comprising an Analog to Digital Converter (ADC). Each pixel of the APS array includes a photoelectric conversion element. The photoelectric conversion element collects free charge carriers generated by absorbing energy like light energy and converts the collected free charge carriers into an electrical energy/analog signal, wherein the analog signal may be voltage or current, corresponding to the respective quantity of collected free charge carriers. The read-out circuit reads the analog signal from each pixel of the APS array and converts the analog signal into a digital signal (by performing an analog to digital conversion). The ADC of the read-out circuit performs the analog to digital conversion by comparing the analog signal of the pixel with a ramp signal using a comparator. The ADC begins counting using a counter from a time point at which the comparator starts comparing the analog signal with the ramp signal and adopts the counting value as the digital signal when the ramp signal reaches the analog signal. The digital signal is used to generate an image corresponding to the amount of detected light energy.

In the image sensor, the analog signal output by the pixel of the APS array may include noise corresponding to the noise received from an external power supply (hereinafter referred to as power supply noise). A PSRR is the capability of the APS array in suppressing the power supply noise received from the external power supply. The PSRR of the APS array causes horizontal noise (HN), which may affect a quality of the generated image. In conventional approaches, the read-out circuit compensates the PSRR, when the PSRR of the APS array is low ((~12 dB). However, the PSRR may be further reduced (for example; less than 8 dB), when the APS array involves the pixels of a submicrometer range. In such a scenario, the read-out circuit may not be able to compensate the degraded PSRR. Thus, in the conventional approaches, the read-out circuit may have a limitation on the lowest PSRR of the APS array that it may correct, without affecting the performance of the image sensor.

SUMMARY

Example embodiments herein provide methods and systems for increasing Power Supply Rejection Ratio (PSRR) compensation range in an image sensor to compensate degraded PSRR of an Active Pixel Sensor (APS) array, wherein the degraded PSRR is compensated by canceling power supply noise of analog signals present on a pixel path using an amplified power supply noise introduced by a supply noise amplifier into ramp signals present on a correction path.

Example embodiments provide methods and systems for compensating high frequency supply noise/the PSRR by matching a phase delay of the power supply noise present on the correction path with a phase delay of the power supply noise present on the pixel path.

Accordingly, example embodiments herein provide methods and systems for compensating Power Supply Rejection Ratio (PSRR) in an image sensor. A method disclosed herein includes receiving, by processing circuitry, at least one analog signal from an active pixels sensor (APS) array, the at least one analog signal including power supply noise, combining, by the processing circuitry, amplified power supply noise with at least one ramp signal to obtain combined power supply noise, and compensating, by the processing circuitry, the PSRR of the APS array by cancelling the power supply noise of the at least one analog signal using the combined power supply noise.

Accordingly, example embodiments herein provide an image sensor comprising an active pixel sensor (APS) array, and a read-out circuit coupled to the APS array configured to compensate a Power Supply Rejection Ratio (PSRR) of the APS array by receiving at least one analog signal from the APS array, the at least one analog signal including power supply noise, combining amplified power supply noise with at least one ramp signal to obtain combined power supply noise, and cancelling the power supply noise of the at least one analog signal using the combined power supply noise.

Example embodiments herein provide Power Supply Rejection Ratio (PSRR) compensation circuitry in an image sensor including an Active Pixel Sensor (APS) array and a plurality of Analog to Digital Converters (ADCs) connected to the APS array, the PSRR compensation circuitry configured to generate generated power supply noise on a correction path based on reading at least one analog signal from the APS array on each of the plurality of ADCs, and compensate a PSRR of the APS array by performing an amplitude correction and a phase correction of the generated power supply noise.

Example embodiments herein provide an image sensor including: an Active Pixel Sensor (APS) array, a plurality of Analog to Digital Converters (ADCs) connected to the APS array, and Power Supply Rejection Ratio (PSRR) compensation circuitry configured to generate generated power supply noise on a correction path based on reading at least one analog signal from the APS array by each of the plurality of ADCs, and compensate a PSRR of the APS array by performing an amplitude correction and a phase correction of the generated power supply noise.

These and other aspects of example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of example embodiments herein without departing from the spirit thereof, and example embodiments herein include all such modifications.

BRIEF DESCRIPTION OF FIGURES

Example embodiments herein are illustrated in the accompanying drawings, throughout which like reference letters indicate corresponding parts in the various figures. Example embodiments herein will be better understood from the following description with reference to the drawings, in which:

FIG. 7 is a flow diagram depicting a method for increasing the PSRR compensation range in the image sensor by performing the phase correction on the correction path, according to example embodiments as disclosed herein;

DETAILED DESCRIPTION

Figure 1:
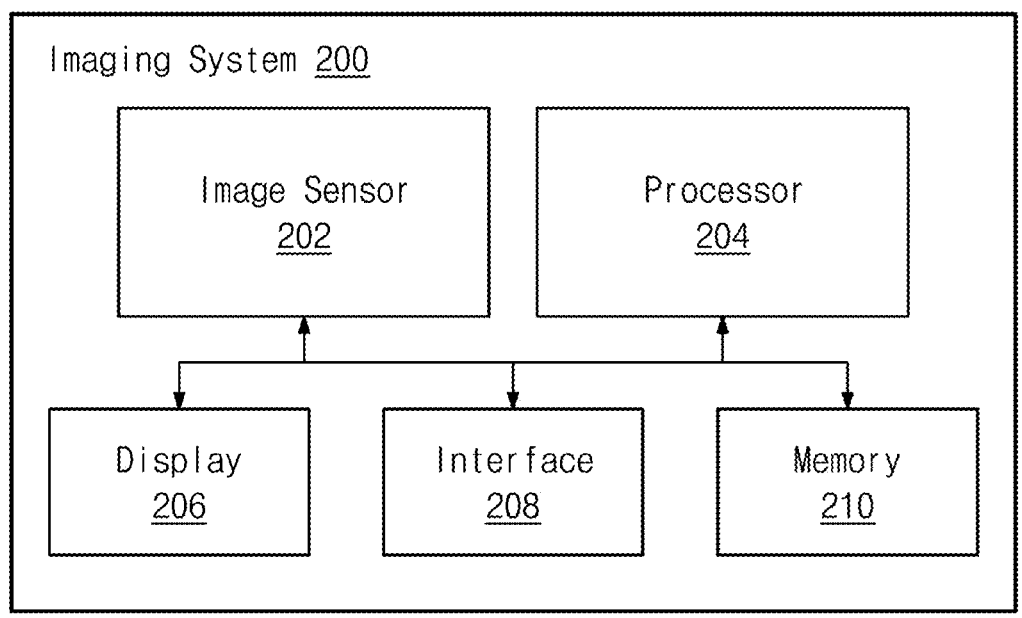
FIG. 1 depicts an imaging system, according to example embodiments as disclosed herein.

Example embodiments herein and the various features and advantageous details thereof are explained more fully with reference to the non-limiting examples that are illustrated in the accompanying drawings and detailed in the following description. Descriptions of well-known components and processing techniques are omitted so as to not obscure example embodiments herein. The description herein is intended merely to facilitate an understanding of ways in which example embodiments herein may be practiced and to further enable those of skill in the art to practice example embodiments described herein. Accordingly, this disclosure should not be construed as limiting the scope of example embodiments described herein.

Example embodiments herein disclose methods and systems for increasing a Power Supply Rejection Ratio (PSRR) range in an image sensor to compensate a degraded PSRR of an Active Pixel Sensor (APS) array of the image sensor.

Example embodiments herein disclose methods and systems for increasing the PSRR compensation range in the image sensor by performing a magnitude correction and a phase delay correction.

Example embodiments herein disclose methods and systems for integrating a power supply amplifier on a correction path to perform the magnitude correction. The magnitude correction may involve:

receiving analog signals including power supply noise of the APS array on a pixel path and ramp signals from a ramp signal generator on the correction path;

introducing the amplified power supply noise into the ramp signals on the correction path; and/or increasing the PSRR compensation range to compensate the PSRR by canceling the power supply noise of the analog signals present on the pixel path using an amplified power supply noise of the ramp signals present on the correction path.

Example embodiments herein disclose methods and systems for performing the phase delay correction by matching the phase delay of the power supply noise present on the correction path with the phase delay of the power supply noise present on the pixel path for an interested range of frequencies.

Referring now to the drawings, and more particularly to FIGS. 1 through 9B, where similar reference characters denote corresponding features consistently throughout the figures, there are shown example embodiments.

FIG. 1 depicts an imaging system 200, according to example embodiments as disclosed herein. The imaging system 200 referred herein may be at least one of a digital camera system, an automotive image sensor system, a surveillance image sensor system, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, and/or any other device capable of capturing an image. In an example herein, the image may be selected from at least one of, but not limited to, still images, moving images, videos, animations, and/or the like. Example embodiments herein may use the terms such as "images", "pictures", "photographs", "videos", "digital videos", "image frames", and so on interchangeably.

The imaging system 200 may include an image sensor 202, a processor 204, a display 206, an interface 208, and/or a memory 210. The image sensor 202 may be a sensor, which may be used to capture the images. In example embodiments, the image sensor 202 may be, but is not limited to, a Complementary Metal Oxide Semiconductor (CMOS) image sensor, a Charge Coupled Device image sensor (CCD) and/or the like. The image sensor 202 may be configured to produce electrical signals by absorbing light reflected by at least one subject (such as a person, a material object, and/or the like), and convert the produced electrical signals into digital signals. In the image sensor, the incident light/absorbed light on pixels of the image sensor 202 may be converted to electrons. The electrons may be further converted to an analog voltage signal. The analog voltage signal may then be converted to digital signals using an Analog to Digital Converter (ADC). The digital signals may include image data/information for depicting an image corresponding to the amount of light absorbed. The image sensor 202 may provide the captured image(s) to the processor 204.

The processor 204 may be at least one of a single processor, a plurality of processors, multiple homogenous cores, multiple heterogeneous cores, multiple Central Processing Unit (CPUs) of different kinds and so on. The processor 204 may also be image processing circuits, microprocessors, microcontrollers, accelerators, graphical processing units, and so on. The processor 204 may be configured to perform processing of the received image. The processing of the image may involve at least one of applying filters on the image, performing object recognition/face recognition, tagging the object recognized with the image, and/or the like.

The display 206 may be configured to receive the processed image from the processor 104 and display the processed image (e.g., to a user).

The interface 208 may be configured to enable the processor 204 to communicate the processed image to at least one external device such as, but not limited to a server, an external database, a cloud server, a chat application, a social media application/network, and/or the like using a communication network. Examples of the communication network, may include, but are not limited to, a wired network (a Local Area Network (LAN), Ethernet and so on), a wireless network (a Wi-Fi network, a cellular network, a Wi-Fi Hotspot, Bluetooth, Zigbee and/or the like), and so on.

The memory 210 may store the processed images, the captured images, and so on. Examples of the memory 210 may include, but are not limited to, a NAND memory, an embedded Multi Media Card (eMMC), a Secure Digital (SD) card, a Universal Serial Bus (USB) drive, a Serial Advanced Technology Attachment (SATA) drive, a solid-state drive (SSD), and so on. The memory 210 may also include one or more computer-readable storage media. The memory 210 may also include one or more non-volatile storage elements. Examples of the non-volatile storage elements may include magnetic hard discs, optical discs, floppy discs, flash memories, and/or forms of electrically programmable memories (EPROM) or electrically erasable and programmable memories (EEPROM). In addition, the memory 210 may, in some examples, be considered a non-transitory storage medium. The term "non-transitory" may indicate that the storage medium is not embodied in a carrier wave or a propagated signal. However, the term "non-transitory" should not be interpreted to mean that the memory 210 is non-movable. In certain examples, a non-transitory storage medium may store data that may, over time, change (e.g., in Random Access Memory (RAM) and/or cache).

Figure 2:
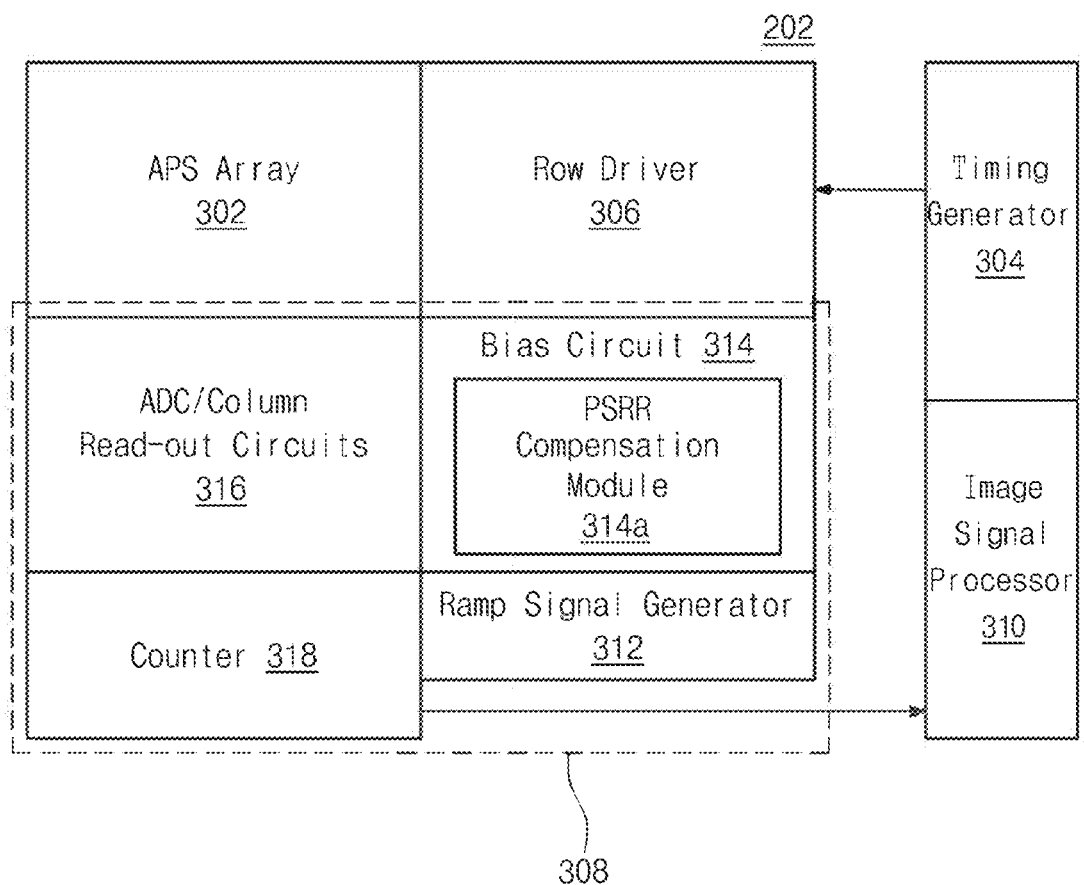
FIG. 2 is a block diagram depicting components of an image sensor of the imaging system, according to example embodiments as disclosed herein.

As depicted in FIG. 2, the image sensor 202 includes an active pixel sensors (APS) array 302, a timing generator 304, a row driver 306, a read-out circuit 308, and/or an image signal processor 310.

Figure 3:
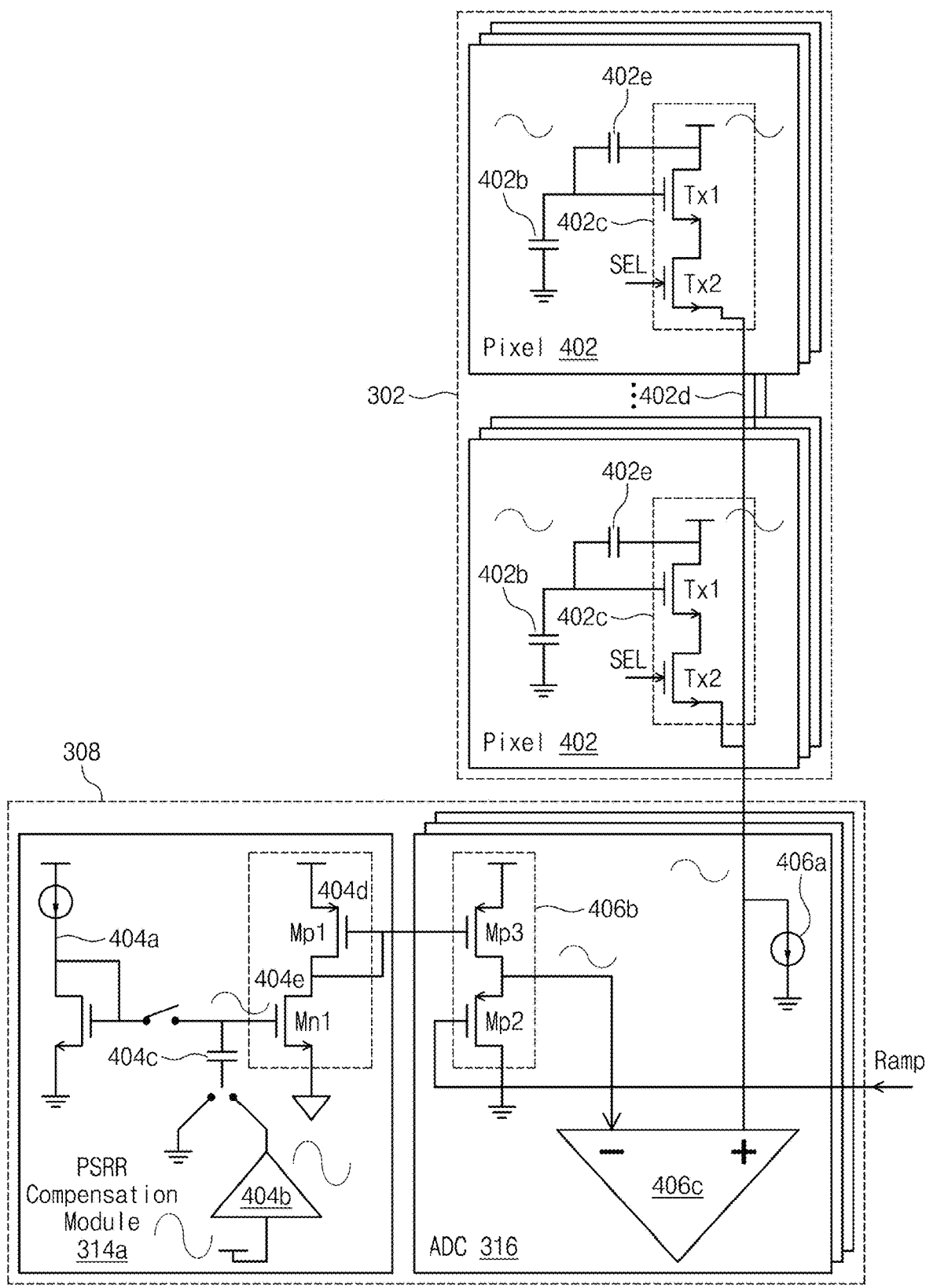
FIG. 3 depicts the image sensor including a PSRR compensation circuitry for increasing the PSRR compensation range in the image sensor by performing the magnitude correction, according to example embodiments as disclosed herein.

The APS array 302 may comprise a plurality of pixels 402 (as depicted in FIG. 3), which may be arranged in a row-column matrix. In an example, the row-column matrix may include m rows, and n columns, such that the APS array 302 includes (m×n) pixels 402. The APS array 302 may comprise a quantity of the plurality of pixels 402 based on a resolution of the same size or a similar size. The size of the pixels 402 may range from sub-micrometers up to few tens of micrometers. Also, the APS array 302 may be provided with a color filter array having multiple color filter elements, which allows a single image sensor 202 to sample light of different colors. The APS array 302 may be configured to absorb the light energy and convert the absorbed light energy into the electrical/analog signals using the pixels 402. The analog signals may be voltage and/or current, corresponding to the amount of absorbed light energy.

The timing generator 304 may be configured to generate timing control signals for operating the pixels 402 of the APS array 302. For example, the timing generator 304 may generate shutter signals row-by-row which reset each photodiode of the pixel 402 in that particular row and marks the beginning of the exposure time. The timing generator 304 may also generate read signals to rows of the APS array 302, which mark an end of integration time and configures the read-out circuit 308 to read particular row(s) of the APS array 302. The timing generator 304 may also be configured to provide clock signals to at least one other component of the image sensor 202 and/or the system 200.

The row driver 306 may be configured to receive row addresses from the read-out circuit 308 and supply driving signals to the pixels 402 of the APS array 302 for controlling the pixels 402 of the APS array 302 corresponding to the received row addresses. Examples of the driving signals may include, but are not limited to, a reset signal (Rx), a pixel selection signal (SEL), a transfer signal (Tx), and so on. In an example, the signal Rx may be used for resetting the pixels 402 of the APS array 302, the signal SEL may be used for selecting the pixels 402 of the APS array 302, and the signal Tx may be used for transferring the electrical signals/analog signals from the selected pixels 402 to the read-out circuit 308. In an example herein, the row driver 306 may supply the driving signals to the pixels 402 of the APS array 302 in a row-wise manner.

The read-out circuit 308 may be configured to receive the electrical/analog signals from the pixels 402 of the APS array 302 and convert the analog signals into the digital signals. The digital signals may be used to depict the image corresponding to the amount of light absorbed by the pixels 402 of the APS array 302. Example embodiments herein use the terms such as "digital signals", "digital pixel data", "digital image data", and so on interchangeably.

The read-out circuit 308 may include a ramp signal generator 312, a bias circuit 314, a plurality of column read-out circuits/Analog to Digital (ADC) converters 316, and/or a plurality of counters 318 for converting the analog signals received from the pixels 402 of the APS array 302 into the digital signals.

The ramp signal generator 312 may be configured to generate a ramp signal. The ramp signal may be a single or multi-slope ramp signal. The ramp signal may be generated using, but is not limited to, a thermometric current steering Digital to Analog Converter (DAC), a method wherein current is pumped into a known capacitor, and so on. The ramp signal generator 312 may provide the generated ramp signals to the column read-out circuit(s) 316.

The bias circuit 314 may be configured to generate current/bias signals used for controlling the plurality of column read-out circuits 316, such as, but not limited to, a comparator current of each read-out column, a pixel load current, and so on. In an example, the bias signals may be generated using a band-gap reference voltage.

The column read-out circuits/ADCs 316 (may also be referred to herein as the column read-out circuits 316, the ADCs 316, and/or the ADC's/column read-out circuits) may be connected to the plurality of columns of pixels 402 of the APS array 302. In an example herein, the column read-out circuits/ADCs 316 may be column parallel single slope ADCs. According to some example embodiments, the column read-out circuits/ADCs 316 may include column read-out circuits and/or ADCs. The column read-out circuits/ADCs 316 may be configured to receive the electrical signals/analog signals from the respectively connected rows of the pixels 402 of the APS array 302 and the ramp signals from the ramp signal generator 312, and perform a comparison of the analog signals with the ramp signal. The column read-out circuit 316 may compare the input analog signal with the ramp signal and produce an output signal (e.g., an output signal indicative of the ramp signal crossing the analog signal value, an output signal having a logic value of '1', etc.) when the ramp signal crosses the analog signal value. The counter 318 may be configured to initiate counting when the column read-out circuit 316 is initiated to compare the analog signal with the ramp signal value. According to example embodiments, the counter 318 may count a duration during which the output signal is not produced (e.g., by sampling the output signal according to a defined period and adding the number of samples not indicative of the output signal). The counter 318 may stop counting on receiving the output signal from the column readout circuit 316. The column readout circuit 316 and the counter 318 may be configured to operate as a Co-related Double Sampler (CDS), wherein a reset measurement is performed and/or completed before an actual signal measurement. The counter 318 may further subtract the corresponding reset measurement values and the actual signal measurements, and use the subtracted value as a digital representation of the light absorbed by the pixels 402. The co-related double sampling may remove or reduce a mismatch between the columns by canceling offsets and low frequency noises. The counter 318 may provide the digital representation of the light absorbed by the pixels 402/digital signals to the image signal processor 310. The image signal processor 310 may be configured to perform at least one processing operation on the received digital signal and/or generate the image corresponding to the amount of light energy absorbed by the APS array 302. Examples of the processing operation may include, but are not limited to, a dark level compensation, a digital gain, a bad pixel correction, and so on.

Further, the analog signal received from the APS array 302 may include power supply noise (due to noise introduced by a power supply coupled with the APS array 302), which may degrade the horizontal noise (HN) performance of the image sensor 202. As depicted in FIG. 3, in each pixel 402 of the APS array 302, the power supply noise may be coupled onto a floating diffusion (FD) node 402b through parasitic capacitances 402e, as well as a drain to source capacitance of a source follower transistor Tx1. The FD node 402b may be configured to minimize or reduce all capacitances in order to maximize or increase a Conversion Gain (CG) of the image sensor 202 (the CG measures the ability of the image sensor 202 to convert one electron received from a photodiode (not shown) of the pixel 402 of the image sensor 202 to as large a voltage change as possible). The power supply noise on the FD node 402b may arrive directly at the output of the pixel 402. The source follower transistor Tx1 is also designed with a minimum or small size so as to improve a Fill Factor of the pixel 402. A resultant low output impedance ($1/G_{ds}$) of the source follower transistor Tx1 may contribute to degradation in a Power Supply Rejection Ratio (PSRR) of the pixel 402. The PSRR of the APS array 302 may be a capability of the APS array 302 to suppress the power supply noise in its output analog signals. The PSRR of the pixel array may be measured as a log ratio of the power supply noise present in its output analog signals to the received/input power supply noise.

In example embodiments, for compensating/correcting the PSRR, a PSRR compensation circuitry/module 314a (also referred to as a PSRR compensation circuit herein) may be integrated within the bias circuit 314. The PSRR compensation circuitry 314a may be connected to the column read-out circuits/ADCs 316. The PSRR compensation circuitry 314a may be configured to perform a magnitude correction and/or a phase delay correction for compensating the degraded PSRR, thereby increasing a PSRR correction range in the image sensor 202. The PSRR correction range depicts (e.g., corresponds to) a compensation ability in the read-out circuit 308 to compensate the PSRR of the APS array 302.

For performing the magnitude correction, the PSRR compensation circuitry 314a may generate power supply noise matching closely to the power supply noise associated with the APS array 302. In example embodiments, the PSRR compensation circuitry 314a may perform an amplification to amplify an amplitude/magnitude of the generated power supply noise in such a way that the magnitude of the generated power supply noise matches the magnitude of the power supply noise of the analog signals received from the pixels 402 of the APS array 302. Example embodiments herein use the terms such as "amplified power supply noise", "induced power supply noise", "larger power supply noise", and so on interchangeably to refer to the power supply noise with the amplified magnitude.

Once the amplified power supply noise is generated, the PSRR compensation circuit 314a may introduce/induce the amplified power supply noise into the ramp signals (e.g., combines the power supply noise with, and/or adds the power supply noise to, the ramp signals) generated (by the ramp signal generator 312) for the column read-out circuits 316. Consequently, the column read-out circuits 316 may compensate/correct the PSRR of the APS array 302 by cancelling the power supply noise present in the received analog signals using the amplified power supply noise introduced in the ramp signals (also referred to herein as the combined power supply noise). Cancelling the power supply noise may involve measuring differences between the magnitude of the power supply noise of the analog signals and the magnitude of the amplified power supply noise of the ramp signals. Since the magnitude of the amplified power supply noise of the ramp signals is adjusted to match with the magnitude of the power supply noise of the analog signals, there may be approximately zero difference that depicts the cancellation of the power supply noise of the analog signals assuming that the signals have zero phase delay.

In example embodiments, the column read-out circuits 316 may compensate/correct the lowest degraded PSRR (that may be caused due to lower pixel pitch and/or due to tighter routing constraints) using the introduction of the amplified power supply noise in the ramp signal. Thus, the compensation of the degraded PSRR of the APS array 302 using the amplified power supply noise may increase/improve the PSRR compensation range significantly in the image sensor 202 without affecting the performance.

For performing the phase delay correction, the PSRR compensation circuitry/module 314a may match a phase delay of the amplified power supply noise in the ramp signal to a phase delay of the power supply noise present in the analog signal provided by the APS array 302 for an interested range of frequencies. The interested range of frequencies may include one or more expected switching frequencies of the Switched Mode Power Supplies (SMPS) which may range from few kHz to 10 s of MHz.

FIG. 3 depicts the image sensor 202 including the PSRR compensation circuitry 314a for increasing the PSRR compensation range in the image sensor 202 by performing the magnitude correction, according to example embodiments as disclosed herein. As depicted in FIG. 3, the APS array 302 may include the plurality of pixels 402 configured to output/produce the analog signals corresponding to the absorbed light energy. Example embodiments herein use the terms such as "pixels", "image sensor pixels", "image pixels", and so on, interchangeably.

Each pixel 402 of the APS array 302 includes a charge detection element/FD region/node 402b, and/or a transfer element 402c. Each pixel 402 of the APS array 302 may also include the photoelectric conversion element (not shown).

The photoelectric conversion element referred herein may be at least one of a photodiode, a phototransistor, a photogate, a Pinned Photo Diode (PPD), and so on. The photoelectric conversion element may be configured to accumulate electrical charge corresponding to the absorbed light energy. When photons of the light energy (that is reflected from the subject) impact a surface of the photoelectric conversion element of the pixel 402, the electrical charge carriers may be produced. In such a scenario, the produced electrical charge or electrons may be transferred on to the FD node 402b using a Transfer switch (TX). The FD node 402b may collect the produced electrical charge carriers and convert the electrical charge carriers into an output signal/electrical signal/analog signal. The produced analog signal may be output from the pixel 402 to the ADC 316 using the source follower transistor Tx1 and a row selection switch Tx2. The output signal may be at least one of voltage, current, and so on. Example embodiments herein are further explained considering the output signal as the analog voltage as an example, but it may obvious to a person skilled in the art that current may also be considered.

The FD node 402b may be a doped semiconductor region that may store the voltage/charge. In an example herein, the FD node 402b may be a capacitor (or intrinsic capacitances of devices), which may store the voltage/charge. The FD node 402b may be configured to store the analog voltage/charge outputted by the photoelectric conversion element of the pixel 402.

The transfer element 402c may include one or more switches/transistors configured to transfer the analog voltage stored at the FD node 402b to the ADC 316 of the read-out circuit 308. In an example herein, the transfer element may include two transistors Tx1 and Tx2, where the Tx1 is the source follower transistor and Tx2 is the row selection switch. The source follower transistor Tx1 may be connected to the power supply and the FD node 402b. The row selection switch Tx2 may be connected to column lines 402d. The column lines 402d may be conductive lines configured to read out the analog voltage of the FD node 402b from the row selection switch Tx2 and supply the read analog voltage to the ADC 316 of the read-out circuit 308.

The pixel 402 may also include a parasitic capacitance 402e. The parasitic capacitance 402e may include a capacitive coupling between a gate terminal, and source and drain terminals of the source follower transistor Tx1 of the transfer element 402c. Also, the parasitic capacitance 402e may include the capacitive coupling between the power supply (not shown) and the FD node 402b, which may propagate the power supply noise to the FD node 402b while supplying the power to the source follower transistor Tx1. Thus, the analog voltage read from the FD node 402b may include the variations of the received power supply noise, which degrade the PSRR of the APS array 302.

In example embodiments, in the APS array 302, on receiving the driving signals from the row driver 306 (e.g., when the row selection switch Tx2 is turned on), the analog voltage stored at the FD node 402b of the pixel 402 may be transferred to the read-out circuit 308. For transferring the analog voltage from the pixel 402 to the read-out circuit 308, the row driver 306 may receive the row address from the read-out circuit 308, wherein the row address specifies the pixel row 402 among the plurality of pixels 402 to be read. The row driver 306 may send the SEL signal to the APS array 302 to enable a selection of the pixel 402 corresponding to the row address to be read in the row-wise manner. The SEL signal may be connected to the gate of the row selection switch Tx2 as depicted in FIG. 3. The row driver 306 may further send the Tx signal to the transfer element 402c of the selected pixel 402 to transfer the electrical charge stored in photodiode to the FD node 402b. On receiving the SEL signal, the transistors (Tx1 and Tx2) of the transfer element 402c transfer/buffer the analog voltage stored at the FD node 402b to the read-out circuit 308 over the column lines 402d. The analog voltage transferred to the read-out circuit 308 includes the power supply noise, which degrades the PSRR of the APS array 302.

The read-out circuit 308 may include the plurality of column read-out circuits/ADCs 316 connected to the plurality of pixels 402 and/or the bias circuit 314 with the PSRR compensation circuitry 314a for converting the analog voltage read from the pixel(s) 402 to the digital voltage. The plurality of column read-out circuits/ADCs 316 may be connected to the PSRR compensation circuitry 314a of the bias circuit 314.

The PSRR compensation circuitry 314a may include a band gap current source 404a, an amplifier 404b, one or more capacitors 404c, and/or current mirrors 404d and 404e.

The band gap current source 404a may generate the current used for operating the column read-out circuits/ADC 316. In an example herein, the current source 404a may generate 10 micro-Amperes (μA) of current.

Figure 4:
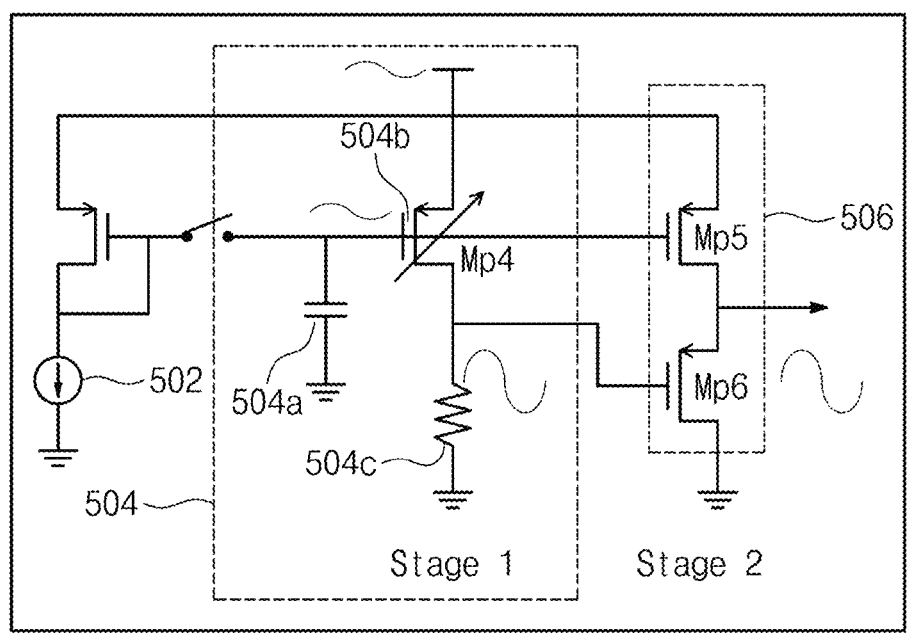
FIG. 4 depicts an amplifier of the PSRR compensation circuitry, according to example embodiments as disclosed herein.

The amplifier 404b may be configured to generate the power supply noise, and amplify the generated power supply noise. In example embodiments, the amplifier 404b may be a configurable gain two-stage supply noise amplifier. The amplifier 404b may include two stages connected with a current source (as depicted in FIG. 4). The stages of the amplifier 404b may be designed in such a way as to provide enough amplification of the power supply noise to compensate the degraded PSRR of the sub micrometer pixels. The design of the amplifier 404b also minimizes or reduces the phase impact caused by limited amplifier bandwidth at the interested range of frequencies and minimizes or reduces horizontal noise (HN) impact. A first stage of the amplifier 404b may comprise a common source amplifier. A second stage of the amplifier 404b may comprise a source follower with a feed forward path to improve gain and minimize or reduce output impedance. The first stage may generate sufficient gain on the power supply noise but has a large output impedance. The large output impedance may cause phase lag in the power supply noise when it directly drives the large capacitance load (capacitor coupling) and hence prevent or reduce optimal or desired cancellation of the power supply noise in the pixel path. In order to prevent or reduce the phase impact, the second stage may be added as depicted in FIG. 4. The second stage may be a P-type Metal Oxide Semiconductor (PMOS) input source follower which provides low output impedance to drive the capacitance load 404c. A small additional gain may be obtained using the feed-forward path and may be used to increase a PSRR compensation range of compensation circuitry.

The one or more capacitors 404c may be configured to be connected to either ground or to the output of the amplifier 404b. In example embodiments, the PSRR compensation circuitry 314a may include a number of capacitors 404c based on configurations of power supply noise amplitude that may be introduced to the ramp signal. In an example herein, the PSRR compensation circuitry 314a may include a larger capacitor bank in order to further increase the PSRR compensation range. The one or more capacitors 404c may be configured to be connected to either the amplified power supply noise or the ground. A ratio of the total capacitance connected to an output of the amplifier 404b to a total capacitance connected to the ground including device capacitances represent attenuation from output of the amplifier 404b to a gate of a Mn1 transistor 404e of the current mirrors.

The current mirrors 404d and 404e may be configured to provide the bias voltage along with the correction power supply noise to the column read-out circuits/ADCs 316. The current mirrors 404d and 404e may include a plurality of transistors. In an example herein, the current mirrors 404d and 404e may include two transistors, a first PMOS transistor (Mp1 transistor), and a first N-type metal-oxide-semiconductor (NMOS) transistor (Mn1 transistor) connected with each other as depicted in FIG. 3. The Mn1 transistor 404e (a gate of the Mn1 transistor 404e) may be coupled with the capacitor 404c. The Mn1 transistor 404e may be configured to receive the amplified power supply noise associated with the output of the amplifier 404b at its gate (the gate of the Mn1 transistor 404e), which already has the bias voltage which may be sampled at a start of the analog to digital conversion. The Mn1 transistor 404e may provide the bias current along with the amplified power supply noise to the Mp1 transistor 404d. The Mp1 transistor 404d may further forward the received current along with the amplified power supply noise to the column read-out circuits 316.

Each column read-out circuit/ADC 316 may include a current source 406a, buffer transistors 406b, and/or a comparator 406c. The current source 406a may be configured to provide current for biasing of the analog voltage of the pixel 402 received over the column lines 402d. An amount of current provided by the current source 406a may determine a strength of the source follower transistor Tx1 in the pixel 402.

The buffer transistors 406b may be coupled to the ramp signal generator 312 and the PSRR compensation circuitry 314a. In an example herein, the buffer transistors 406b may include two transistors, e.g., a second PMOS transistor (Mp2 transistor) and a third PMOS transistor (Mp3 transistor), connected with each other as shown in FIG. 3. The Mp2 transistor may be connected to the ramp signal generator 312 and the Mp3 transistor may be connected to the Mp1 transistor 404d of the PSRR compensation circuitry/module 314a. The Mp3 and Mp2 transistors may be configured to buffer the ramp signal (hereinafter considered as ramp voltage for example) received from the ramp signal generator 312. The Mp3 transistor may receive the current along with the amplified power supply noise from the Mp1 transistor 404d of the PSRR compensation circuitry 314b. The Mp3 transistor may introduce/induce the received amplified power supply noise in the buffered ramp signal/ramp buffer output, and the Mp2 transistor may forward the ramp buffer output including the amplified power supply noise to the comparator 406c.

The comparator 406c may receive the analog voltage (including the power supply noise) from the FD node 402b of the connected pixel 402 over the column lines 402d at a positive terminal. A path including a reception of the analog voltage at the positive terminal of the comparator 406c may be referred herein as a pixel path. The comparator 406c may also receive the ramp voltage (including the amplified power supply noise) from the buffer transistors 406b at its negative terminal. A signal path including a reception of the amplified power supply noise at the ramp buffer transistors 406b, an introduction of the amplified power supply noise to the ramp voltage by the buffer transistors 406b, and a reception of the ramp voltage including the amplified power supply noise at the negative terminal of the comparator 406c may be referred herein as a correction path.

The comparator 406c may be configured to perform the comparison of the analog voltage of the pixel 402 and the ramp voltage (e.g., the voltage used for converting the analog voltage to the digital voltage) and measure the difference between the analog voltage and the ramp voltage. The comparator 406c may compensate the degraded PSRR of the APS array 302 by canceling the power supply noise of the analog voltage of the pixel 402 while performing the comparison. The comparator 406c may cancel the power supply noise by performing a subtraction of the magnitude of the power supply noise of the analog voltage of the pixel 402 from the magnitude of the amplified power supply noise of the ramp voltage. In example embodiments, due to the introduction of the amplified power supply noise on the correction path, the PSRR compensation range of the comparator 406c in the image sensor 202 may be increased and/or improved. In example embodiments, the PSRR compensation range in the image sensor 202 may be measured based on the gain of the amplifier and the transconductances and/or impedances of the Mp1 transistor 404d and the Mn1 transistor 404e. In an example herein, the overall PSRR compensation range may be measured as:

$$PSRR \text{ compensation range} = A * \frac{Gm_{M_{n1}}}{Gm_{M_{p1}}}$$

wherein, A represents the gain of the amplifier 404b and $$\frac{Gm_{M_n}}{Gm_{M_p}}$$

represents a ratio of the transconductances and/or impedances of the Mp1 transistor 404d and the Mn1 transistor 404e for a normalized current.

FIG. 4 depicts the amplifier 404b of the PSRR compensation circuitry 314a, according to example embodiments as disclosed herein.

The amplifier 404b may be configured to amplify the power supply noise. In example embodiments, the amplifier 404b may be a supply noise amplifier 404b, which may be a configurable gain two-stage amplifier. The amplifier 404b may include the two stages connected with a power supply/current source 502 coupled with a transistor, wherein the first stage 504 may comprise the common source amplifier and the second stage 506 may comprise the source follower with a feed forward path to improve gain and have minimized or reduced output impedance. In an example herein, the current source 502 may be configured to provide 150 µA of current to the first stage 504 and second stage 506 of the amplifier 404b.

The first stage 504 may include a capacitor 504a, a transistor 504b, and/or a resistor 504c. A terminal of the capacitor 504a may be connected to gate of a fourth PMOS transistor (Mp4 transistor) 504b and the other terminal may be connected to ground. The capacitor 504a may provide the power supply noise as a current in the Mp4 transistor 504b which is terminated using a resistance 504c. A source and drain of the Mp4 transistor may be connected to the external power supply and the resistor 504c, respectively. In an example herein, the resistor 504c may be a resistor having a moderate or large resistance value (for example: 1.2 Kohm). The current source 502 may provide the bias voltage to the amplifier 404b, or within the amplifier 404b (as illustrated), which may then be sampled on the gate of the Mp4 transistor. The Mp4 transistor along with the resistor 504c may amplify the power supply noise. The amplified power supply noise may be provided as the current in the Mp4 transistor which is then terminated using the resistance 504c. Hence, the gain in supply noise provided by the first stage 504 may be calculated as $Gm_{M_{p3}}*R$ where R is the resistance of 504c.

The second stage 506 may be a source follower stage along with a small feed forward gain. In an example herein, the source follower stage 506 may include two P-type NMOS transistors (a fifth PMOS transistor (Mp5 transistor) and a sixth PMOS transistor (Mp6 transistor)). The Mp5 and Mp6 transistors may be source follower transistors. The Mp5 and Mp6 transistors may be connected to the first stage 504. The Mp5 and Mp6 transistors may be configured to receive the amplified power supply noise from the first stage 504 by connecting to the components of the first stage 504. The Mp5 and Mp6 transistors may be further configured to forward the received amplified power supply noise to the one or more capacitors 404c of the PSRR compensation circuitry 314a. This may be advantageous because the first stage 504 may not able to drive the amplified power supply noise to the one or more capacitors 404c due to its large resistance without a significant phase lag. According to example embodiments, the second stage 506 may forward the received amplifier power supply noise to the one or more capacitors 404c with no phase delay in an interested range of frequencies.

In example embodiments, the introduction of the amplified power supply noise by the amplifier 404b on the correction path may increase the PSRR compensation range in the image sensor 202. The PSRR compensation range may depend on the gain of the amplifier 404b. For example, if 'A' is the gain of the amplifier 404b, then the PSRR compensation range may be improved by 'A' times. The gain (A) of the amplifier 404b may be measured using the below equation:

$$A = Gm_{M_{p3}} * R + \frac{Gm_{M_{p5}}}{Gm_{M_{p6}}}$$

wherein, $Gm_{M_{p3}}$ represents the transconductance of the Mp4 transistor, R represents the resistance of the resistor 504c, and $$\frac{Gm_{M_{p4}}}{Gm_{M_{p5}}}$$

represents a ratio of the transconductance of the Mp5 transistor and the Mp6 transistor.

Figure 5:
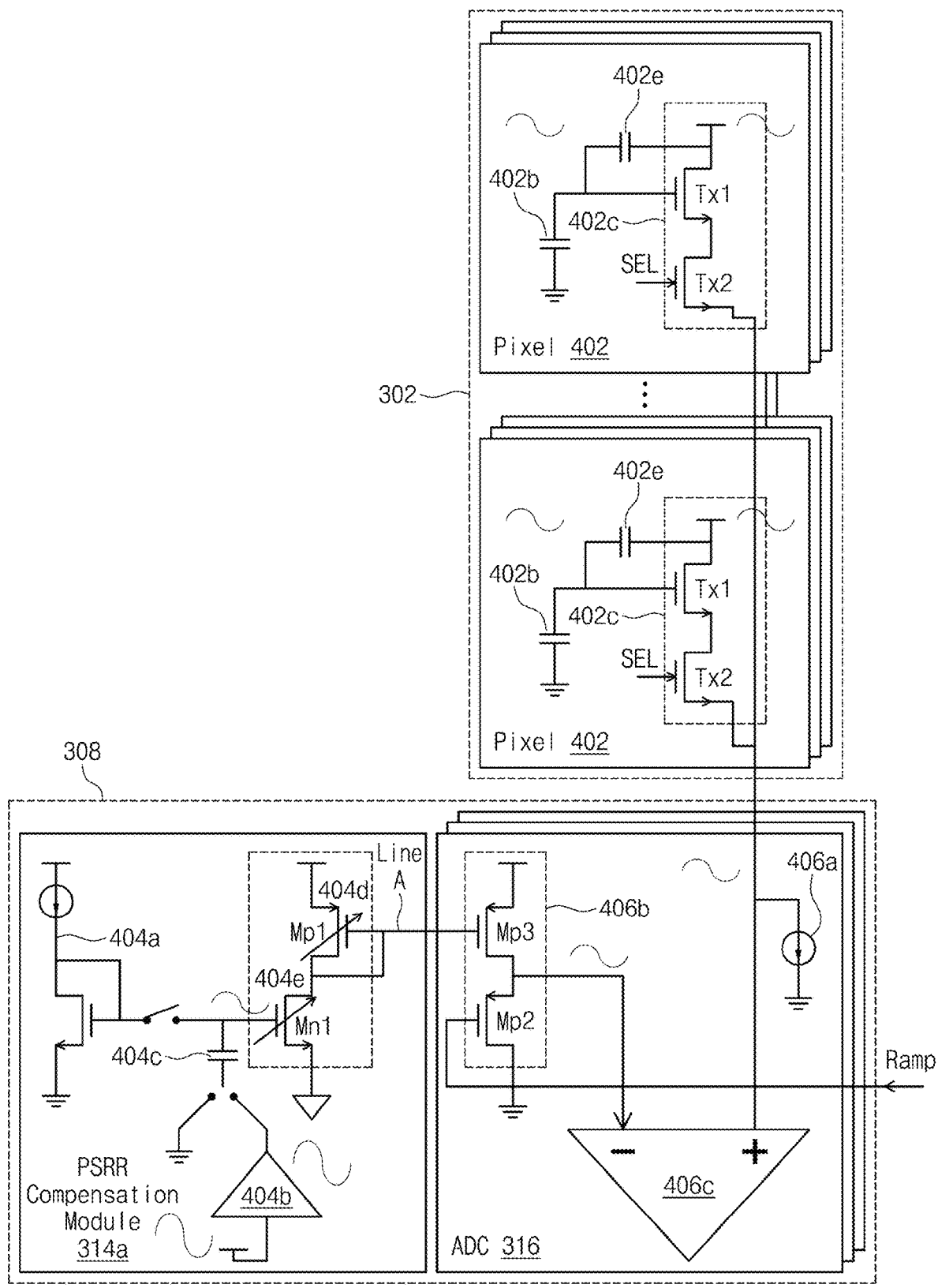
FIG. 5 depicts the image sensor including the PSRR compensation circuitry for performing the phase correction to increase the PSRR compensation range in the image sensor, according to example embodiments as disclosed herein.

FIG. 5 depicts the image sensor 202 including the PSRR compensation circuitry 314a for performing the phase correction to increase the PSRR compensation range in the image sensor 202, according to example embodiments as disclosed herein. Example embodiments herein enable the PSRR compensation circuitry 314a to match the phase delay of the amplified power supply noise introduced on the correction path with the phase delay of the power supply noise introduced on the pixel path by the pixels for the interested range of frequencies. The interested range of frequencies may be expected switching frequency of the SMPS which may range from few kHz to 10 s of MHz. The readout circuit 308 may implement a co-related double sampler (CDS), wherein signal and reset voltages are measured within a small time delay between them which effectively nullifies or reduces the low frequency power supply noise. Further, the comparator 406c employed in the column read-out circuits/ADCs 316 of the readout circuit 308 may have a low pass characteristic in-order to remove or reduce high frequency noise. Thus, the effective frequency compensation range is between the low pass and high pass cut-offs wherein the power supply noise may directly affect the performance which may vary from around 50 kHz to 2-3 MHz based on a design architecture of the image sensor 202, timings, and so on.

As depicted in FIG. 5, the current mirrors 404d and 404e of the PSRR compensation circuit 314a may be connected to the buffer transistors 406b of the column read-out circuit 316 over a conductive line (depicted as 'line A' in FIG. 5). The line A may be a conductive line that runs across all the column read-circuits connected to all the pixels 402. The line A may include parasitic elements such as, but not limited to, resistors, capacitors, and so on. The line A may introduce a resistor-capacitor (RC) phase delay over the correction path due to its parasitic elements and transconductance of the Mp1 transistor 404d, when the current mirrors 404d and 404e of the PSRR compensation circuit 314a provide the power supply along with the amplified power noise to the buffer transistors 406b of the column read-out circuit 316 over the line A.

In example embodiments, the PSRR compensation circuit 314a may perform the phase correction by matching the RC phase delay on the correction path with the phase delay on the pixel path. The PSRR compensation circuit 314a may configure the RC phase delay on the correction path to match with the phase delay on the pixel path by controlling the impedance and/or transconductance of the Mp1 transistor 404d of the current mirror 404d. The PSRR compensation circuitry 314a may control the impedance of the Mp1 transistor 404d by modifying its configurations. In example embodiments herein, modifying the configurations of the Mp1 transistor 404d may involve changing a size and/or multiplier(s) of the Mp1 transistor 404d with a similar size change in the Mn1 transistor 404e. In example embodiments, the size/multipliers of the Mn1 transistor 404e may be changed in similar proportions, so that the power supply/current provided to the buffer transistors 406b of the column read-out circuits 316 may be unchanged or similar.

FIGS. 2-5 show example components of the image sensor 202, but it is to be understood that example embodiments are not limited thereon. In example embodiments, the image sensor 202 may include less or more components. Further, the labels or names of the components are used only for illustrative purposes and do not limit the scope of example embodiments. One or more components may be combined together to perform same or substantially similar function in the image sensor 202.

Figure 6:
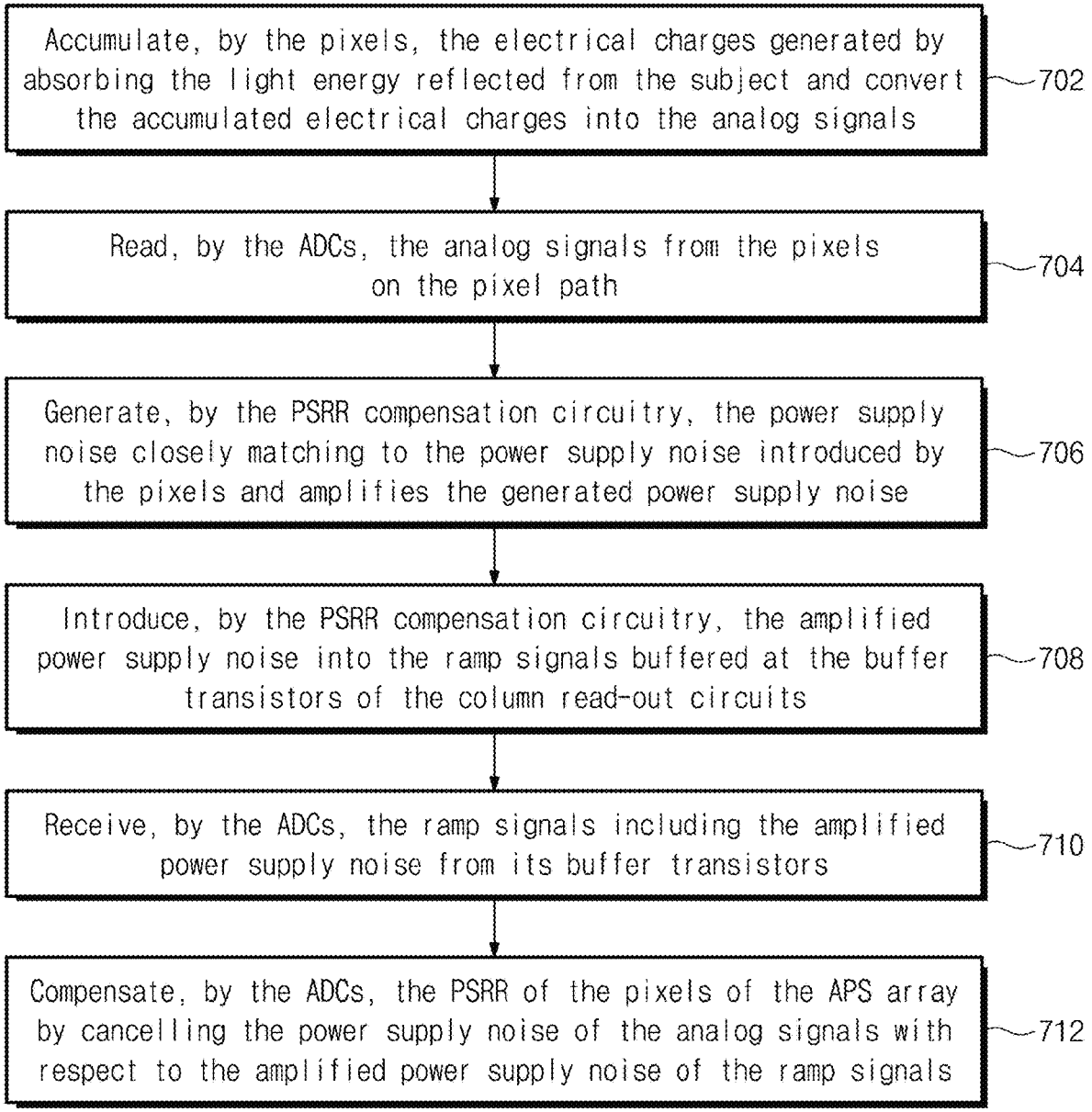
FIG. 6 is a flow diagram depicting a method for increasing the PSRR compensation range in the image sensor by performing the amplitude/magnitude correction on the correction path, according to example embodiments as disclosed herein.

FIG. 6 is a flow diagram depicting a method 700 for increasing the PSRR compensation range in the image sensor 202 by performing the amplitude/magnitude correction on the correction path, according to example embodiments as disclosed herein.

At operation 702, the pixels 402 may accumulate the electrical charges generated by absorbing the light energy reflected from the subject and convert the accumulated electrical charges into the electrical/analog signals. At operation 704, the column read-out circuits/ADCs 316 connected to the pixels 402 may read the analog signals from the pixels 402 on the pixel path. The read analog signals include the power supply noise introduced by the pixels 402, which may be degraded the PSRR of the APS array 302.

At operation 706, the PSRR compensation circuit 314a may generate the power supply noise closely matching to the power supply noise introduced by the pixels 402 and amplify the generated power supply noise. The generated power supply noise may be amplified in such a way that its magnitude closely matches with the magnitude of the analog signals received on the pixel path.

At operation 708, the PSRR compensation circuit 314a may introduce the amplified power supply noise into the ramp signals buffered at the buffer transistors 406b of the column-read out circuits 316. At operation 710, the column read-out circuits 316 may receive the ramp signals including the amplified power supply noise from its buffer transistors 406b on the correction path.

At operation 712, the column read-out circuits 316 may compensate the degraded PSRR of the APS array 302 by subtracting the power supply noise of the analog signals from the amplified power supply noise of the ramp signals. The column read-out circuits 316 may perform the comparison of magnitude of the power supply noise of the analog signals received on the pixel path with the ramp signals along with the amplified power supply and cancel the power supply noise of the analog signals, since the magnitude of the amplified power supply noise of the ramp signals closely match with the magnitude of the analog signals. Thereby, compensating the degraded PSRR of the APS array 302 with the increased PSRR compensation range. The various operations 702-712 may be performed in the order presented, in a different order, or simultaneously or contemporaneously. Further, in example embodiments, some actions listed in FIG. 6 may be omitted.

FIG. 7 is a flow diagram depicting a method 800 for increasing the PSRR compensation range in the image sensor 202 by performing the phase correction on the correction path, according to example embodiments as disclosed herein.

At operation 802, the line A connecting the PSRR compensation circuitry 314a to the column read-out circuits 316 may generate the phase delay on the correction path due to its parasitic elements.

At operation 804, the PSRR compensation circuitry 314a may modify the configurations of the Mp1 transistor 404d of the current mirrors (in a similar proportion to the Mn1 transistor 404e) with the generated phase delay on the correction path and the phase delay introduced on the pixel path. The configurations may include the size/multipliers of the Mp1 transistor 404d.

At operation 806, the PSRR compensation circuitry 314a may control the impedance of the Mp1 transistor 404d based on the modified configurations, so that the phase delay on the correction path may be configured to match with or be similar to the phase delay on the pixel path. The various operations 802-806 may be performed in the order presented, in a different order, or simultaneously or contemporaneously. Further, in example embodiments, some actions listed in FIG. 7 may be omitted.

Figure 8:
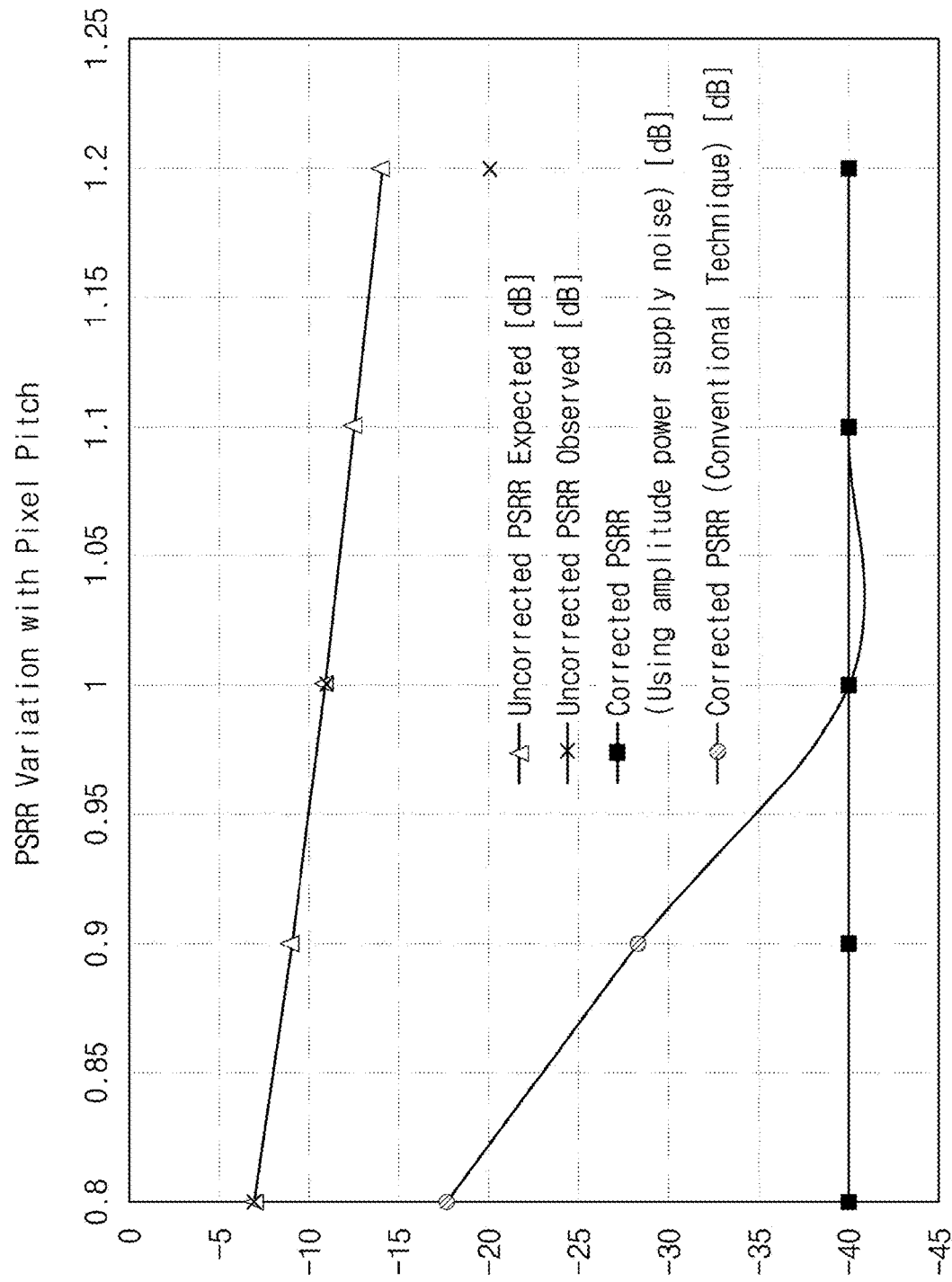
FIG. 8 is an example graph depicting the PSRR variations with pixel pitch, according to example embodiments as disclosed herein.

FIG. 8 is an example graph depicting the PSRR variations with the pixel pitch, according to example embodiments as disclosed herein. Conventional approaches may have limited scope for compensating the lowest degraded PSRR caused due to the reduction in the size of the pixels. In contrast, example embodiments herein compensate the lowest degraded PSRR caused due to the reduction in the size of the pixels 402 of the APS array 302. The lowest degraded PSRR may be compensated/corrected by performing the magnitude correction and/or the phase correction of the power supply noise on the correction path. The PSRR compensation range of compensating the degraded PSRR due to the reduction in the size of the pixels is depicted in FIG. 8.

Figure 9A:
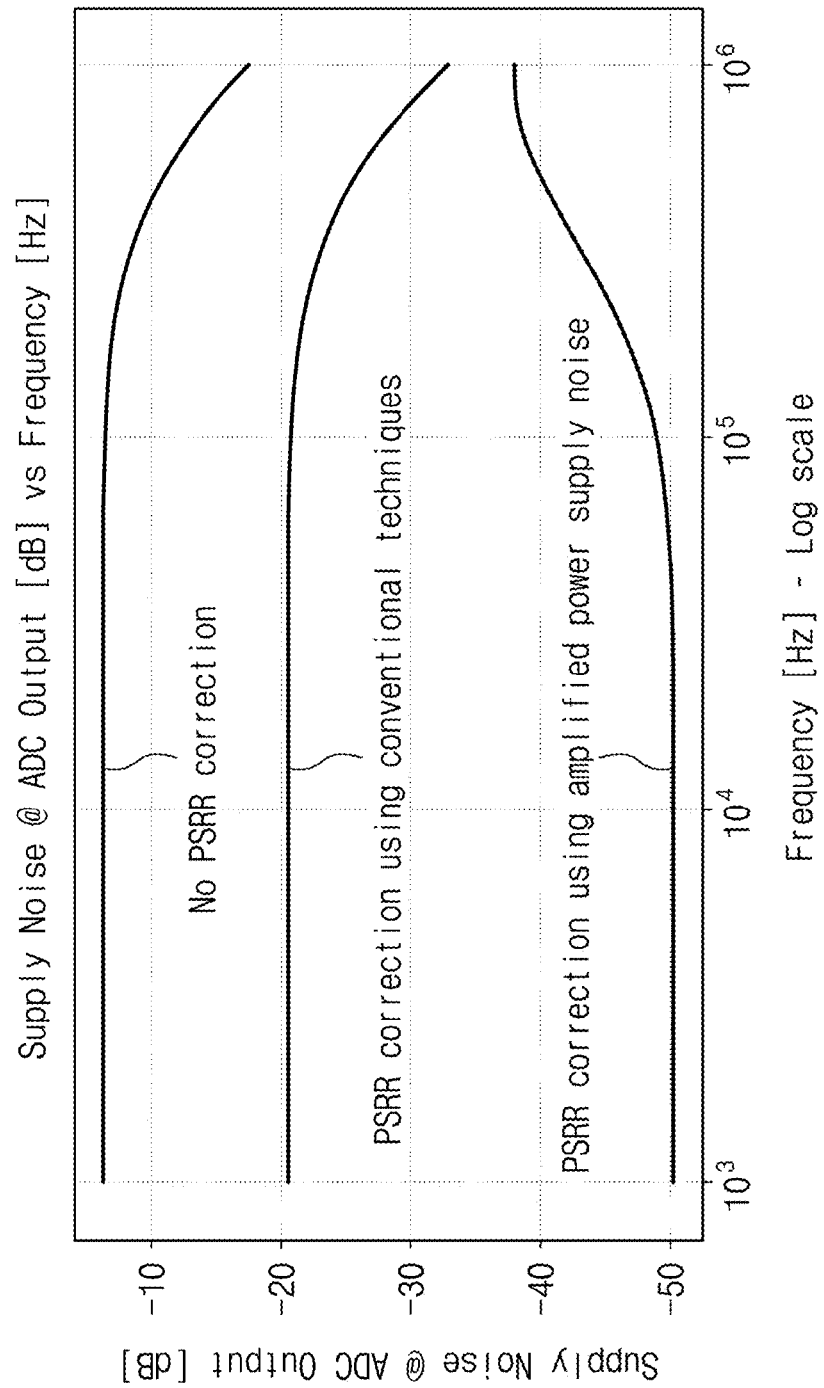
FIGS. 9A and 9B are example graphs depicting the improvement in the PSRR in the image sensor due to the magnitude correction and the phase correction performed on the power supply noise present on the correction path in simulations and in silicon measurements respectively, according to example embodiments as disclosed herein.
Figure 9B:
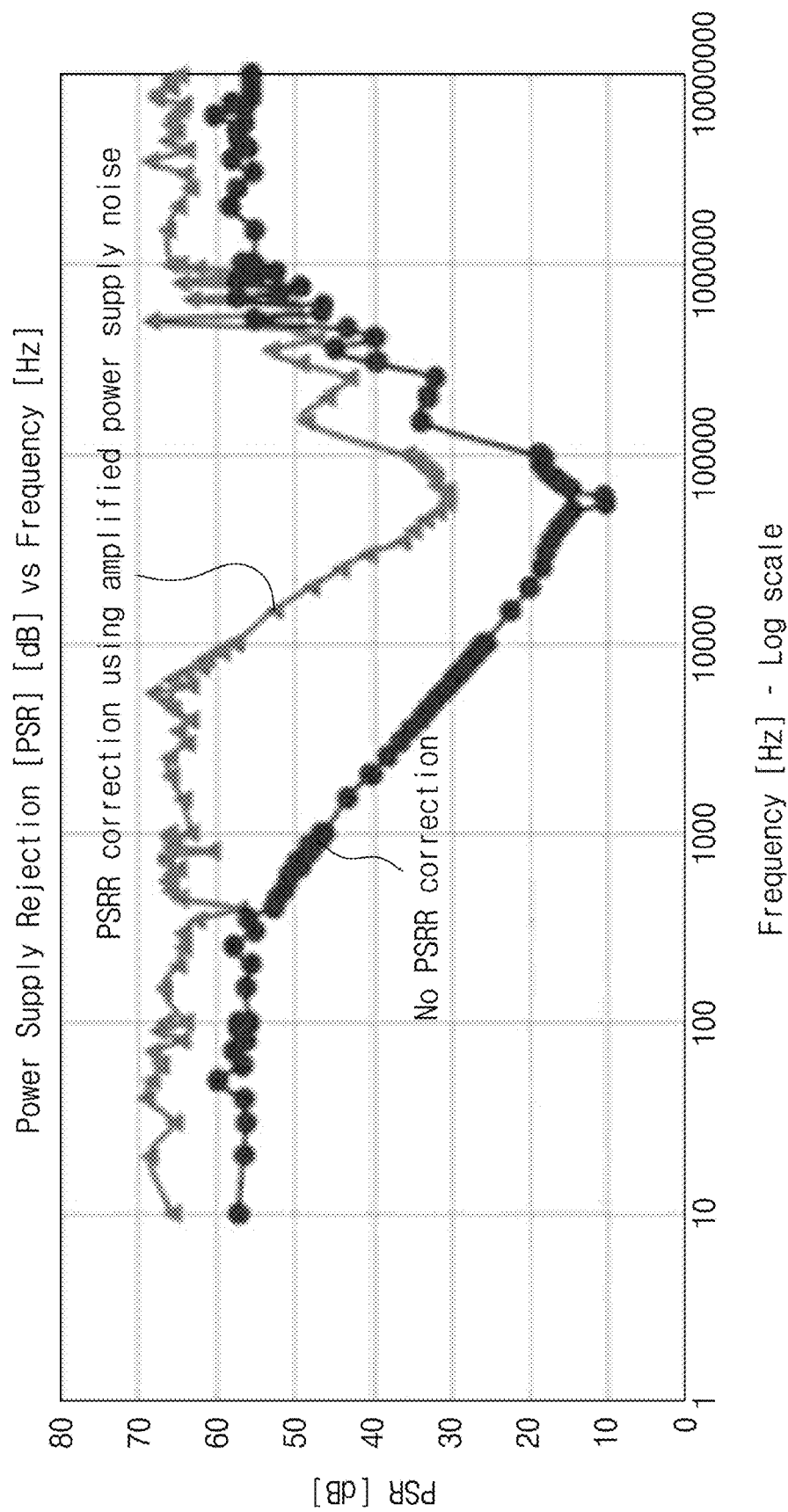

FIGS. 9A and 9B are example graphs depicting the improvement in the PSRR in the image sensor 202 due to the magnitude correction and the phase correction performed on the power supply noise present on the correction path, according to example embodiments as disclosed herein.

Conventional devices for compensating the PSRR of APS arrays have an insufficient PSRR compensation range to adequately compensate the PSRR of APS arrays having pixels of a sub-micrometer range in size.

However, example embodiments provide for the introduction of the amplified power supply noise on the correction path, thereby enabling the PSRR compensation range of the comparator 406c in the image sensor 202 to be increased and/or improved (e.g., the PSRR compensation range corresponding to the gain of the amplifier 404b and the transconductances and/or impedances of the Mp1 transistor 404d and the Mn1 transistor 404e). Accordingly, example embodiments herein improve a range of Power Supply Rejection Ratio (PSRR) compensation method used by an image sensor, which is advantageous for APS arrays with sub-micrometer pixels that have lower PSRR than the APS arrays supported by existing/conventional designs. Example embodiments herein ensure that the design of sub micrometer pixels may be performed without constraint, or with less constraint, from the PSRR as the correction range is increased. Matching of amplitude and phases between actual supply noise path and correction path helps in attaining high PSRR levels. Example embodiments disclosed herein improve the range of the PSRR compensation method without affecting other sensor performance parameters and area/power of the image sensor.

Example embodiments disclosed herein may be implemented through at least one software program running on at least one hardware device to control the elements. The elements shown in FIGS. 1-5 may be at least one of a hardware device, or a combination of hardware device and software module.

In example embodiments, operations described herein as being performed by the imaging system 200, the image sensor 202, the processor 204, the APS array 302, the timing generator 304, the row driver 306, the read-out circuit 308, the image signal processor 310, ramp signal generator 312, the bias circuit 314, the plurality of column read-out circuits/ADC converters 316, the plurality of counters 318, the PSRR compensation circuitry 314a, the charge detection element/FD region/node 402b, the transfer element 402c, the comparator 406c and/or the amplifier 404b may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

It will be understood that when an element is referred to as being "connected" or "coupled" to another element, it may be directly connected or coupled to the other element or intervening elements may be present. As used herein the term "and/or" includes any and all combinations of one or more of the associated listed items.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

The foregoing description of example embodiments will so fully reveal the general nature of example embodiments herein that others may, by applying current knowledge, readily modify and/or adapt the same for various applications without departing from the generic concepts, and, therefore, such adaptations and modifications should and are intended to be comprehended within the meaning and range of equivalents of disclosed example embodiments. It is to be understood that the phraseology or terminology employed herein is for the purpose of description and not of limitation. Therefore, while example embodiments herein have been described in terms of examples, those skilled in the art will recognize that the examples herein may be practiced with modification within the spirit and scope of example embodiments as described herein.

We claim:

1. A method for compensating a Power Supply Rejection Ratio (PSRR) in an image sensor, the method comprising:
   receiving, by processing circuitry, at least one analog signal from an active pixels sensor (APS) array, the at least one analog signal including power supply noise;
   combining, by the processing circuitry, amplified power supply noise with at least one ramp signal to obtain combined power supply noise; and
   compensating, by the processing circuitry, the PSRR of the APS array by cancelling the power supply noise of the at least one analog signal using the combined power supply noise,
   wherein the combining includes amplifying generated power supply noise using an amplifier to generate the amplified power supply noise, the amplifier having
      a first stage including a common source amplifier, and
      a second stage including a source follower with a feed forward path.

2. The method of claim 1, wherein the APS array comprises a plurality of pixels arranged in a plurality of rows and columns for generating the at least one analog signal in response to absorbed light energy.

3. The method of claim 1, wherein
   receiving the at least one analog signal includes reading the at least one analog signal from at least one column of the APS array, the APS array including a plurality of pixels, the power supply noise degrading the PSRR of the APS array; and
   the method further comprises
      receiving the at least one ramp signal, and
      buffering the at least one ramp signal using buffer transistors.

4. The method of claim 3, wherein the at least one ramp signal includes a single slope ramp signal or a multi-slope ramp signal.

5. The method of claim 3, wherein the buffer transistors comprise a first P-type Metal Oxide Semiconductor (PMOS) transistor and a second PMOS transistor.

6. The method of claim 1, wherein the combining comprises:
   generating the generated power supply noise matching with the power supply noise of the at least one analog signal and
   combining the amplified power supply noise with the at least one ramp signal by introducing the amplified power supply noise into the at least one ramp signal buffered at buffer transistors using at least one capacitor and current mirrors.

7. The method of claim 6, wherein
   the common source amplifier is configured to generate the amplified power supply noise; and
   the source follower with the feed forward path is configured to forward the amplified power supply noise to the at least one capacitor with no phase delay in a range of frequencies.

8. The method of claim 6, wherein the current mirrors include a first N-type Metal Oxide Semiconductor (NMOS) transistor (Mn1 transistor) and a third PMOS transistor (Mp1 transistor) connected to the at least one capacitor.

9. The method of claim 8, further comprising:
   receiving, by the Mn1 transistor, the amplified power supply noise from the at least one capacitor;
   providing, by the Mn1 transistor, the amplified power supply noise along with a bias voltage to the Mp1 transistor; and providing, by the Mp1 transistor, the amplified power supply noise along with the bias voltage to the buffer transistors.

10. The method of claim 1, wherein cancelling the power supply noise of the at least one analog signal comprises:
subtracting an amplitude of the power supply noise of the at least one analog signal using an amplitude of the combined power supply noise.

11. The method of claim 1, further comprising:
compensating, by the processing circuitry, the PSRR of the APS array by matching a phase delay of the combined power supply noise to a phase delay of the power supply noise of the at least one analog signal for a range of frequencies.

12. The method of claim 11, wherein
the combining combines the amplified power supply noise with the at least one ramp signal by introducing the amplified power supply noise into the at least one ramp signal buffered at buffer transistors using at least one capacitor and current mirrors, the current mirrors including a third PMOS transistor (Mp1 transistor) connected to the at least one capacitor; and
the matching the phase delay includes
modifying configurations of the Mp1 transistor based on the phase delay of the power supply noise of the at least one analog signal, the configurations including multipliers of the Mp1 transistor, and
controlling an impedance of the Mp1 transistor based on the configurations to match the phase delay of the combined power supply noise to the phase delay of the at least one analog signal.

13. An image sensor comprising:
an active pixel sensor (APS) array; and
a read-out circuit coupled to the APS array configured to compensate a Power Supply Rejection Ratio (PSRR) of the APS array by
receiving at least one analog signal from the APS array, the at least one analog signal including power supply noise,
combining amplified power supply noise with at least one ramp signal to obtain combined power supply noise, and
cancelling the power supply noise of the at least one analog signal using the combined power supply noise,
wherein the combining includes amplifying generated power supply noise using an amplifier to generate the amplified power supply noise, the amplifier having a first stage including a common source amplifier, and a second stage including a source follower with a feed forward path.

14. The image sensor of claim 13, wherein the APS array comprises a plurality of pixels arranged in a plurality of rows and columns for generating the at least one analog signal in response to absorbed light energy.

15. The image sensor of claim 13, wherein the read-out circuit comprises:
a plurality of Analog to Digital Converters (ADCs) connected to a plurality of columns of the APS array, the plurality of columns including a plurality of pixels, wherein each ADC among the plurality of ADCs is configured to
receive the at least one analog signal by reading the at least one analog signal from at least one of the plurality of columns of the APS array, the power supply noise degrading the PSRR of the APS array,
receive the at least one ramp signal, and
buffer the at least one ramp signal using buffer transistors.

16. The image sensor of claim 15, wherein the at least one ramp signal includes a single slope ramp signal or a multi-slope ramp signal.

17. The image sensor of claim 15, wherein the buffer transistors comprises a first P-type Metal Oxide Semiconductor (PMOS) transistor, and a second PMOS transistor.

18. The image sensor of claim 13, wherein the read-out circuit comprises the amplifier.

19. The image sensor of claim 18, wherein the read-out circuit is configured to:
generate the generated power supply noise matching with the power supply noise of the at least one analog signal; and
combine the amplified power supply noise with the at least one ramp signal by introducing the amplified power supply noise into the at least one ramp signal buffered at buffer transistors using at least one capacitor and current mirrors.

20. The image sensor of claim 19, wherein
the common source amplifier is configured to generate the amplified power supply noise; and
the source follower with the feed forward path is configured to forward the amplified power supply noise to the at least one capacitor with no phase delay in a range of frequencies.

* * * * *